United States Patent
Bai et al.

(10) Patent No.: US 11,621,807 B2
(45) Date of Patent: Apr. 4, 2023

(54) DATA TRANSMISSION METHOD AND DEVICE

(71) Applicant: CHINA ACADEMY OF TELECOMMUNICATIONS TECHNOLOGY, Beijing (CN)

(72) Inventors: Wei Bai, Beijing (CN); Xuejuan Gao, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/048,398

(22) PCT Filed: Mar. 6, 2019

(86) PCT No.: PCT/CN2019/077146
§ 371 (c)(1),
(2) Date: Oct. 16, 2020

(87) PCT Pub. No.: WO2019/201023
PCT Pub. Date: Oct. 24, 2019

(65) Prior Publication Data
US 2021/0176018 A1 Jun. 10, 2021

(30) Foreign Application Priority Data

Apr. 20, 2018 (CN) .......................... 201810360637.X

(51) Int. Cl.
*H04L 1/16* (2006.01)
*H04L 5/00* (2006.01)
(Continued)

(52) U.S. Cl.
CPC .......... *H04L 1/1858* (2013.01); *H04L 5/0007* (2013.01); *H04W 72/0446* (2013.01); *H04W 72/1257* (2013.01); *H04W 72/1268* (2013.01)

(58) Field of Classification Search
CPC ............... H04L 1/1858; H04L 5/0007; H04W 72/0446; H04W 72/1257; H04W 72/1268
(Continued)

(56) References Cited

U.S. PATENT DOCUMENTS

2007/0211657 A1 9/2007 McBeath et al.
2020/0146032 A1* 5/2020 Bae .................... H04W 72/1268
(Continued)

FOREIGN PATENT DOCUMENTS

CN 101500259 A 8/2009
CN 105451164 A 3/2016
(Continued)

OTHER PUBLICATIONS

R1-1805057 (Year: 2018).*
(Continued)

*Primary Examiner* — Intekhaab A Siddiquee
(74) *Attorney, Agent, or Firm* — Ladas & Parry, LLP

(57) ABSTRACT

The present disclosure provides a data transmission method and device, and relates to the technical field of communications. The data transmission method is applied to the data transmission device and includes: determining a transmission type used when performing data transmission, where the transmission type includes one of a single transmission of target data in one slot and multiple repetitive transmissions of target data in one slot; determining the number of repetitive transmissions of the target data in each slot, when the transmission type is multiple repetitive transmissions of
(Continued)

target data in one slot; transmitting the target data according to the number of repetitive transmissions of the target data in each slot.

10 Claims, 3 Drawing Sheets

(51) Int. Cl.
    *H04W 72/04*     (2009.01)
    *H04W 72/12*     (2009.01)
    *H04L 1/1829*     (2023.01)
    *H04W 72/0446*     (2023.01)
    *H04W 72/1268*     (2023.01)

(58) Field of Classification Search
    USPC .......................................................... 370/329
    See application file for complete search history.

(56) References Cited

U.S. PATENT DOCUMENTS

2020/0275431 A1     8/2020     Bae et al.
2021/0377937 A1     12/2021     Takeda et al.

FOREIGN PATENT DOCUMENTS

| CN | 105635932 A | 6/2016 |
|---|---|---|
| JP | 2021502773 A | 1/2021 |
| WO | 2019/003841 A1 | 1/2019 |
| WO | 2019/193732 A1 | 10/2019 |

OTHER PUBLICATIONS

R1-1803390 (Year: 2018).*
R1-1804103 (Year: 2018).*
R1-1802488 (Year: 2018).*
R1-1802215 (Year: 2018).*
Extended European Search Report from EP app No. 19788188.1, dated May 3, 2021.
"Remaining issues for 7.1.3.3.4", R1-1803390, 3GPP TSG RAN WG1#92, Athens Greece, Feb. 26-Mar. 2, 2018.
"Discussion on PUSCH repetition for grant-fee transmission", R1-1804103, 3GPP TSG RAN WG1 Meeting #92bis, Sanya, China, Apr. 16-20, 2018.
"UL data transmission procedure", R1-1805057, 3GPP TSG RAN WG1 Meeting #92bis, Sanya, China, Apr. 16-20, 2018.
First Office Action and Search Report from CN app. No. 201810360637.X, dated Mar. 29, 2021, with English translation provided by Global Dossier.
International Search Report from PCT/CN2019/077146, dated May 9, 2019, with English translation provided by WIPO.
Written Opinion of the International Searching Authority from PCT/CN2019/077146, dated May 9, 2019, with English translation provided by WIPO.
International Preliminary Report on Patentability from PCT/CN2019/077146, dated Oct. 20, 2020, with English translation from WIPO.
"3rd Generation Partnership Project; Technical Specification Group Radio Access Network; NR; User Equipment (UE) radio access capabilities (Release 15)", 3GPP TS 38.306 V15.1.0, Mar. 2018.
"Remaining issues on UL data transmission procedure", R1-1802215, 3GPP TSG RAN WG1 Meeting #92, Athens, Greece, Feb. 26-Mar. 2, 2018.
"Remaining issues on UL data transmission procedure", R1-1804560, 3GPP TSG RAN WG1 Meeting #92bis, Sanya, China, Apr. 16-20, 2018.
NTT Docomo, Inc., "Offline summary for AI 7.1.3.3.4 UL data transmission procedure", R1-1803295, 3GPP TSG RAN WG1 Meeting #92, Athens, Greece, Feb. 26-Mar. 2, 2018, all pages.
Notice of Reason for Refusal from JP app. No. 2020-558492, dated Nov. 30, 2021, with English translation from Global Dossier, all pages.
First Office Action for Korean Patent Application 10-2020-7033345 issued by the Korean Patent Office dated Dec. 19, 2022 and Its English Translation provided by the Korean Patent Office.
"Offline summary for AI 7.1 3.3.4 UL data transmission procedure," 3GPP TSG RAN WG1 Meeting #92bis, R1-1805539, Sanya, China, Apr. 16-20, 2018, Source: NTT DOCOMO, Inc., Agenda Item: 7.1.3.3 4, all pages.

* cited by examiner

DATA TRANSMISSION METHOD AND DEVICE

CROSS-REFERENCE TO RELATED APPLICATIONS

This application is the U.S. national phase of PCT Application PCT/CN2019/077146 filed on Mar. 6, 2019, which claims the benefit and priority of Chinese Application No. 201810360637.X, filed on Apr. 20, 2018, the disclosures of which are incorporated herein by reference in their entireties.

TECHNICAL FIELD

The present disclosure relates to the field of communications technology, and in particular to a data transmission method and device.

BACKGROUND

With development and changes in requirements of mobile communication services, many organizations such as 3rd Generation Partnership Project (3GPP) have begun to study a new wireless communication system (i.e., 5 Generation New Radio Access Technology (5G NR)) for future mobile communication systems. In the 5G NR system, in order to reduce time delay, increase reliability and reduce control signaling overhead, a first type of uplink scheduling-free transmission scheme and a second type of uplink scheduling-free transmission scheme are introduced.

In the 5G NR system, with respect to resource allocation for uplink data transmission on Physical Uplink Shared Channel (PUSCH), a mapping type A scheme and a mapping type B scheme are introduced. In the ongoing 3GPP technical discussion, for the first type of uplink scheduling-free transmission scheme and the second type of uplink scheduling-free transmission scheme, if repetitive transmission and the mapping type A scheme are used, only slot-level repetitive uplink data transmission is supported, that is, multiple PUSCH repetitions cannot appear in one slot but can only appear in different slots, a position of an Orthogonal Frequency Division Multiplexing (OFDM) symbol occupied by PUSCH in each slot is the same. However, in the related art, for the first type of uplink scheduling-free transmission scheme and the second type of uplink scheduling-free transmission scheme, if repetitive transmission and the mapping type B scheme are used, there is no clear scheme of how to support repetitive uplink data transmission.

SUMMARY

Embodiments of the present disclosure provide a data transmission method and device, which can solve the problem of poor network flexibility caused by that the related art does not provide a scheme for how to support multiple repetitive data transmissions in one slot, for the first type of uplink scheduling-free transmission scheme and the second type of uplink scheduling-free transmission scheme.

In order to solve the above technical problems, one embodiment of the present disclosure provides a data transmission method, applied to a data transmission device, including:

determining a transmission type used when performing data transmission; wherein the transmission type includes one of a single transmission of target data in one slot and multiple repetitive transmissions of target data in one slot;

determining the number of repetitive transmissions of the target data in each slot, when the transmission type is multiple repetitive transmissions of target data in one slot;

transmitting the target data according to the number of repetitive transmissions of the target data in each slot.

Optionally, the step of determining a transmission type used when performing data transmission, includes:

obtaining a location of a start orthogonal frequency division multiplexing (OFDM) symbol in a time-frequency resource location of a first transmission in a slot;

determining the transmission type used when performing data transmission according to the location of the start OFDM symbol.

Further, the step of determining the transmission type used when performing data transmission according to the location of the start OFDM symbol, includes:

judging whether an index of the location of the start OFDM symbol is less than a preset value;

determining that the transmission type is the multiple repetitive transmissions of target data in one slot, when the index of the location of the start OFDM symbol is less than the preset value;

determining that the transmission type is the single transmission of target data in one slot, when the index of the location of the start OFDM symbol is greater than or equal to the preset value.

Further, the step of determining the transmission type used when performing data transmission according to the location of the start OFDM symbol, includes:

determining a type of an index of the location of the start OFDM symbol;

determining that the transmission type is the multiple repetitive transmissions of target data in one slot, when the index of the location of the start OFDM symbol is a first preset type;

determining that the transmission type is the single transmission of target data in one slot, when the index of the location of the start OFDM symbol is a second preset type.

Specifically, the first preset type is an odd type, and the second preset type is an even type.

Optionally, the step of determining a transmission type used when performing data transmission, includes:

obtaining transmission type indication information;

determining the transmission type used when performing data transmission according to the transmission type indication information.

Specifically, the transmission type indication information is a newly added field used to indicate the transmission type after each index in a target data symbol allocation table.

Optionally, the step of determining the number of repetitive transmissions of the target data in each slot, includes:

determining the number of repetitive transmissions of the target data in a slot, according to a location of a start orthogonal frequency division multiplexing (OFDM) symbol in a time-frequency resource location of a first transmission in a slot and the number of occupied symbols;

determining the number of repetitive transmissions of the target data in each slot, if a target number of repetitive transmissions of the target data is unable to be completed within a slot;

wherein resources used for repetitive transmissions of the target data in each slot are the same, and slots occupied by completing the target number of the repetitive transmissions of the target data is the least.

Optionally, the step of determining the number of repetitive transmissions of the target data in each slot, includes:

according to a formula: M=K/N, determining the number of repetitive transmissions of the target data in each slot;

wherein M represents the number of transmission times in each slot; K represents a target number of times; N represents the number of slots occupied by transmission of the target data.

Further, when the target data is physical uplink shared channel (PUSCH), the data transmission device is a terminal, and the data transmission includes: a first type of uplink scheduling-free transmission, a second type of uplink scheduling-free transmission or an uplink dynamic scheduling transmission.

Further, when the target data is physical downlink shared control channel (PDSCH), the data transmission device is a network device, and the data transmission includes: downlink dynamic scheduling transmission or downlink semi-persistent scheduling transmission.

One embodiment of the present disclosure further provides a data transmission device, including: a memory, a processor, and a computer program stored on the memory and executable on the processor; wherein the processor executes the computer program to perform the following steps of:

determining a transmission type used when performing data transmission; wherein the transmission type includes one of a single transmission of target data in one slot and multiple repetitive transmissions of target data in one slot;

determining the number of repetitive transmissions of the target data in each slot, when the transmission type is multiple repetitive transmissions of target data in one slot;

transmitting the target data according to the number of repetitive transmissions of the target data in each slot.

Optionally, the processor executes the computer program to perform the following steps of:

obtaining a location of a start orthogonal frequency division multiplexing (OFDM) symbol in a time-frequency resource location of a first transmission in a slot;

determining the transmission type used when performing data transmission according to the location of the start OFDM symbol.

Further, the processor executes the computer program to perform the following steps of:

judging whether an index of the location of the start OFDM symbol is less than a preset value;

determining that the transmission type is the multiple repetitive transmissions of target data in one slot, when the index of the location of the start OFDM symbol is less than the preset value;

determining that the transmission type is the single transmission of target data in one slot, when the index of the location of the start OFDM symbol is greater than or equal to the preset value.

Further, the processor executes the computer program to perform the following steps of:

determining a type of an index of the location of the start OFDM symbol;

determining that the transmission type is the multiple repetitive transmissions of target data in one slot, when the index of the location of the start OFDM symbol is a first preset type;

determining that the transmission type is the single transmission of target data in one slot, when the index of the location of the start OFDM symbol is a second preset type.

Specifically, the first preset type is an odd type, and the second preset type is an even type.

Optionally, the processor executes the computer program to perform the following steps of:

obtaining transmission type indication information;

determining the transmission type used when performing data transmission according to the transmission type indication information.

Specifically, the transmission type indication information is a newly added field used to indicate the transmission type after each index in a target data symbol allocation table.

Optionally, the processor executes the computer program to perform the following steps of:

determining the number of repetitive transmissions of the target data in a slot, according to a location of a start orthogonal frequency division multiplexing (OFDM) symbol in a time-frequency resource location of a first transmission in a slot and the number of occupied symbols;

determining the number of repetitive transmissions of the target data in each slot, if a target number of repetitive transmissions of the target data is unable to be completed within a slot;

wherein resources used for repetitive transmissions of the target data in each slot are the same, and slots occupied by completing the target number of the repetitive transmissions of the target data is the least.

Specifically, the processor executes the computer program to perform the following steps of:

according to a formula: M=K/N, determining the number of repetitive transmissions of the target data in each slot;

wherein M represents the number of transmission times in each slot; K represents a target number of times; N represents the number of slots occupied by transmission of the target data.

Further, when the target data is physical uplink shared channel (PUSCH), the data transmission device is a terminal, and the data transmission includes: a first type of uplink scheduling-free transmission, a second type of uplink scheduling-free transmission or an uplink dynamic scheduling transmission.

Further, when the target data is physical downlink shared control channel (PDSCH), the data transmission device is a network device, and the data transmission includes: downlink dynamic scheduling transmission or downlink semi-persistent scheduling transmission.

One embodiment of the present disclosure further provides a computer-readable storage medium, including a computer program stored thereon; wherein the computer program is executed by a processor to implement steps of the above data transmission method.

One embodiment of the present disclosure further provides a data transmission device, including:

a first determining module configured to determine a transmission type used when performing data transmission; wherein the transmission type includes one of a single transmission of target data in one slot and multiple repetitive transmissions of target data in one slot;

a second determining module configured to determine the number of repetitive transmissions of the target data in each slot, when the transmission type is multiple repetitive transmissions of target data in one slot;

a transmission module configured to transmit the target data according to the number of repetitive transmissions of the target data in each slot.

The beneficial effects of the present disclosure are:

According to the above solutions, when the transmission type is multiple repetitive transmissions of target data in one slot, the number of repetitive transmissions of the target data in each slot is determined, and then the target data is transmitted according to the number of repetitive transmissions, thereby realizing multiple repetitive data transmissions in one slot, improving the network communication process and increasing flexibility of the network communication.

DETAILED DESCRIPTION

In order to make objectives, technical solutions and advantages of the present disclosure more clear, the present disclosure will be described hereinafter in details in conjunction with the drawings and specific embodiments.

Related concepts mentioned in the present disclosure will be explained as follows.

In the 5G NR, PUSCH mapping type A means that starting from OFDM symbol 0 in a slot, with a length of 3-14 OFDM symbols, demodulation reference signal (DMRS) is located in OFDM symbol 2, and K repetitive transmissions for PUSCH are adopted, where K may be 1, 2, 4 or 8, and only one PUSCH repetition can be transmitted in each slot. For example, if K=4, PUSCH is transmitted in 4 consecutive slots. For the first type of uplink scheduling-free transmission scheme, information such as a start slot, the number of OFDM symbols occupied in the slot and frequency domain resource location, are notified to a terminal by a radio resource control (RRC) signaling. For the second type of uplink scheduling-free transmission scheme, information such as a start slot, the number of OFDM symbols occupied in the slot and frequency domain resource location, are notified to a terminal by a downlink control information (DCI) activation signaling.

In the 5G NR, PUSCH mapping type B means that starting from any OFDM symbol in a slot, with a length of 1-14 OFDM symbols, DMRS is located in a start OFDM symbol.

Embodiments of the present disclosure are to solve the problem of poor network flexibility caused by that the related art does not provide a scheme for how to support multiple repetitive data transmissions in one slot, for the first type of uplink scheduling-free transmission scheme and the second type of uplink scheduling-free transmission scheme.

Figure 1:
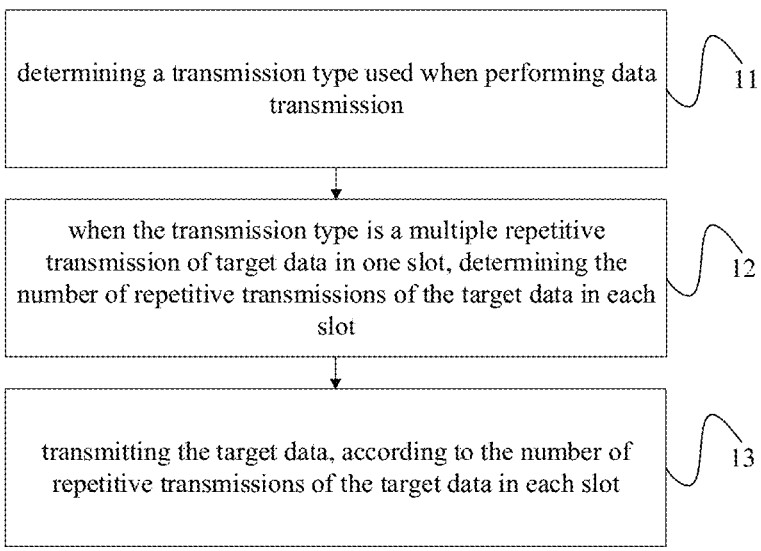
FIG. 1 is a schematic flowchart of a data transmission method according to an embodiment of the present disclosure.

As shown in FIG. 1, one embodiment of the present disclosure provides a data transmission method, which is operated by a data transmission device and includes the following steps.

Step 11: determining a transmission type used when performing data transmission.

Specifically, the transmission type includes one of a single transmission of target data in one slot and multiple repetitive transmissions of target data in one slot. It should be noted that the single transmission of target data means that the target data can only be transmitted once in one slot; and the multiple repetitive transmission of target data means that the target data can be transmitted at least one time in one slot, it should be noted that in this case, if multiple transmissions of the target data cannot be guaranteed in one slot, the target data can only be transmitted once in one slot.

It should be noted here that the target data mentioned in this embodiment may be a physical uplink shared control channel (PUSCH) or a physical downlink shared control channel (PDSCH).

Step 12: when the transmission type is multiple repetitive transmissions of target data in one slot, determining the number of repetitive transmissions of the target data in each slot.

Step 13: transmitting the target data, according to the number of repetitive transmissions of the target data in each slot.

It should be noted that when the transmission type supports multiple repetitive transmissions, it is necessary to determine each slot occupied by transmission and the number of repetitive transmissions in each slot, and transmit the target data according to the number of repetitive transmissions in each slot, thereby realizing multiple repetitive transmissions of the target data in one slot and increasing flexibility of 5G NR network communication.

It should be noted that the data transmission method may be applied not only to the case of PUSCH transmission on a terminal side, but also to the case of PDSCH transmission on a network device side. Specifically, when the target data is PUSCH, the data transmission device is a terminal, and the data transmission includes: a first type of uplink scheduling-free transmission, a second type of uplink scheduling-free transmission or an uplink dynamic scheduling transmission. When the target data is PDSCH, the data transmission device is a network device, and the data transmission includes: downlink dynamic scheduling transmission or downlink semi-persistent scheduling transmission.

Specifically, in a specific implementation, the step 11 may be implemented in one of the following ways.

First Way

In this way, an implementation process of the step 11 includes:

obtaining a location of a start orthogonal frequency division multiplexing OFDM symbol in a time-frequency resource location of a first transmission in a slot;

determining the transmission type used when performing data transmission according to the location of the start OFDM symbol.

Specifically, an implementation of determining the transmission type used when performing data transmission according to the location of the start OFDM symbol, includes:

judging whether an index of the location of the start OFDM symbol is less than a preset value;

when the index of the location of the start OFDM symbol is less than the preset value, determining that the transmission type is the multiple repetitive transmission of target data in one slot;

when the index of the location of the start OFDM symbol is greater than or equal to the preset value, determining that the transmission type is the single transmission of target data in one slot.

For example, indexes of OFDM symbols in a slot are 0 to 13; when an index of a start OFDM symbol is less than a given value (for example, 7), multiple repetitive transmissions are performed in one slot; when the index of the start OFDM symbol is greater than or equal to the given value, single transmission is performed in one slot.

Specifically, another implementation of determining the transmission type used when performing data transmission according to the location of the start OFDM symbol, includes:

determining a type of an index of the location of the start OFDM symbol;

when the index of the location of the start OFDM symbol is a first preset type, determining that the transmission type is the multiple repetitive transmission of target data in one slot;

when the index of the location of the start OFDM symbol is a second preset type, determining that the transmission type is the single transmission of target data in one slot.

Specifically, the first preset type is an odd type, and the second preset type is an even type.

For example, indexes of OFDM symbols in a slot are 0 to 13; when an index of a start OFDM symbol is an odd type, multiple repetitive transmissions are performed in one slot; when the index of the start OFDM symbol is an even type, single transmission is performed in one slot.

Second Way

In this way, an implementation process of the step 11 includes:

obtaining transmission type indication information;

determining the transmission type used when performing data transmission according to the transmission type indication information.

It should be noted that the transmission type indication information is a newly added field used to indicate the transmission type after each index in a target data symbol allocation table.

For example, when the target data is PUSCH, in the 5G NR, the network device configures a PUSCH-symbol allocation table for the terminal through radio resource control (RRC) signaling. This table provides time domain resources of PUSCH, including an interval slot (i.e., K2) from a moment when the network device transmits DCI to a moment when the terminal transmits PUSCH, a start and length indicator value (i.e., SLIV, which refers to a start OFDM symbol of the resources and a length of OFDM symbols occupied by the resources), PUSCH mapping type and other information. Meanwhile, indication information of a single transmission of target data in one slot or multiple repetitive transmissions of target data in one slot is added to this table. The terminal can directly look up the table to obtain whether a single repetitive transmission or multiple repetitive transmissions are performed in a slot when PUSCH is transmitted on a specific resource.

It should also be noted that the network device may also add a 1-bit field to downlink control information (DCI) to indicate whether to perform a single transmission or multiple repetitive transmissions in a slot during this time domain resource scheduling. The network device may add a new sub-message parallel to time domain allocation in the radio resource control (RRC), to indicate whether to perform a single transmission or multiple repetitive transmissions in a slot during this time domain resource scheduling.

Specifically, a specific implementation of the step 12 in one embodiment of the present disclosure includes:

determining the number of repetitive transmissions of the target data in a slot, according to a location of a start orthogonal frequency division multiplexing OFDM symbol in a time-frequency resource location of a first transmission in a slot and the number of occupied symbols;

if a target number of repetitive transmissions of the target data (i.e., a total number of repetitive transmissions of the target data) is unable to be completed within a slot, then determining the number of repetitive transmissions of the target data in each slot;

where resources used for repetitive transmissions of the target data in each slot are the same, and slots occupied by completing the target number of the repetitive transmissions of the target data is the least. It should be noted that in this case, same resources are used in each slot.

For example, when the terminal performs PUSCH transmission, a target number is 8 times, and 8 transmissions is unable to be completed in one slot. At this point, the terminal should determine the number of repetitive transmissions of PUSCH in each slot. When the terminal determines that a maximum number of times that PUSCH is able to be transmitted in a slot is 3 times, in order to ensure that the resources used for repetitive transmissions of the target data in each slot are the same, the terminal determines that 4 slots need to be occupied when transmitting PUSCH, and two PUSCH transmissions are performed in each slot.

For example, K repetitive transmissions for PUSCH are adopted, where K may be 1, 2, 4 or 8. Only one PUSCH repetitive transmission can be performed in each slot. For example, if K=4, PUSCH is transmitted in 4 consecutive slots, and same resources are used in each slot. For the first type of uplink scheduling-free transmission scheme, information such as a resource cycle, a start slot, a time-frequency resource location of a first transmission in a slot, the number K of times of PUSCH repetitive transmissions, PUSCH mapping type (i.e., PUSCH mapping type A or PUSCH mapping type B), are notified to the terminal by RRC signaling. A subsequent slot has the same transmission situation as the start slot. For the second type of uplink scheduling-free transmission scheme, the network device configures, for the terminal through RRC signaling, information such as a resource cycle, the number K of times of PUSCH repetitive transmissions, PUSCH mapping type (i.e., PUSCH mapping type A or PUSCH mapping type B); the network device configures a start slot and a time-frequency resource location of a first transmission in a slot for the terminal through activation signaling, and a subsequent slot has the same transmission situation as the start slot.

Specifically, the step of determining the number of repetitive transmissions of the target data in each slot, includes:

according to a formula: M=K/N, determining the number of repetitive transmissions of the target data in each slot;

where M represents the number of transmission times in each slot; K represents the target number of times; N represents the number of slots occupied by transmission of the target data.

It should be noted that, when data transmission is applied to the terminal side, in a 5G NR first type of uplink scheduling-free transmission scheme, the network device configures, for the terminal through RRC signaling, information such as a resource cycle, a start slot, a time-frequency resource location of a first transmission in a slot, the number K of times of PUSCH repetitive transmissions, PUSCH mapping type (i.e., PUSCH mapping type A or PUSCH mapping type B). In a 5G NR second type of uplink scheduling-free transmission scheme, the network device configures, for the terminal through RRC signaling, information such as a resource cycle, the number K of times of PUSCH repetitive transmissions, PUSCH mapping type (i.e., PUSCH mapping type A or PUSCH mapping type B), and the network device configures a start slot and a time-frequency resource location of a first transmission in a slot for the terminal through activation signaling.

With an example that the terminal transmits PUSCH, specific transmission situation is exemplified with following various situations and OFDM symbols in a slot in each situation are indexed from 0 to 13.

First situation: in the first type of uplink scheduling-free transmission, a specific implementation of the embodiments of the present disclosure is as follows.

The network device configures, for the terminal through RRC signaling, information such as that a resource cycle P is 4 slots, a start slot is a second slot in the cycle, a time-frequency resource location of a first transmission in a slot is OFDM symbol index 3, a time domain resource length is 2 OFDM symbols, the number K of times of PUSCH repetitive transmissions is equal to 4, and PUSCH mapping type is PUSCH mapping type B. In the foregoing configuration, as starting from the OFDM symbol index 3 which is an odd number, so multiple repetitive transmissions are performed in one slot; since there are 14 OFDM symbols in one slot and each repetitive transmission occupies 2 OFDM symbols, the required 4 repetitive transmissions is able to be completed in one slot.

Figure 2:
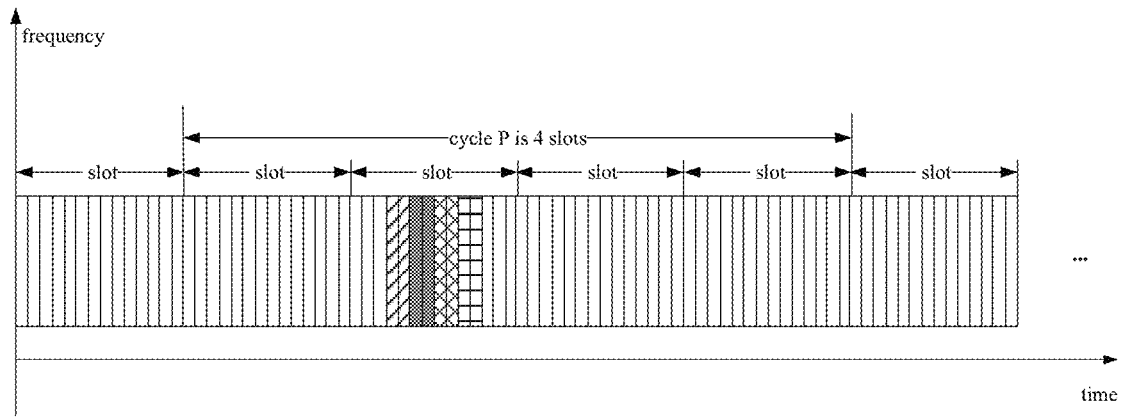
FIG. 2 is a first schematic diagram showing PUSCH transmission.

According to the foregoing configuration, in a second slot of each cycle, the terminal will perform a first PUSCH repetitive transmission on OFDM symbol indexes 3 and 4, a second PUSCH repetitive transmission on OFDM symbol indexes 5 and 6, a third PUSCH repetitive transmission on OFDM symbol indexes 7 and 8, and a fourth PUSCH repetitive transmission on OFDM symbol indexes 9 and 10. A frequency domain resource location of each repetitive transmission is the same, and the specific transmission situation is shown in FIG. 2.

Second situation: in the first type of uplink scheduling-free transmission, when the PUSCH mapping type B scheme is adopted, a specific implementation of the embodiments of the present disclosure is as follows.

The network device configures, for the terminal through RRC signaling, information such as that a resource cycle P is 4 slots, a start slot is a second slot in the cycle, a time-frequency resource location of a first transmission in a slot is OFDM symbol index 3, a time domain resource length is 3 OFDM symbols, the number K of times of PUSCH repetitive transmissions is equal to 4, and PUSCH mapping type is PUSCH mapping type B. In the foregoing configuration, as starting from the OFDM symbol index 3 which is an odd number, so multiple repetitive transmissions are performed in one slot; since there are 14 OFDM symbols in one slot and each repetitive transmission occupies 3 OFDM symbols, the required 4 repetitive transmissions is unable to be completed in one slot, and then in this case, 4 repetitive transmissions need to be completed in 2 slots.

Figure 3:
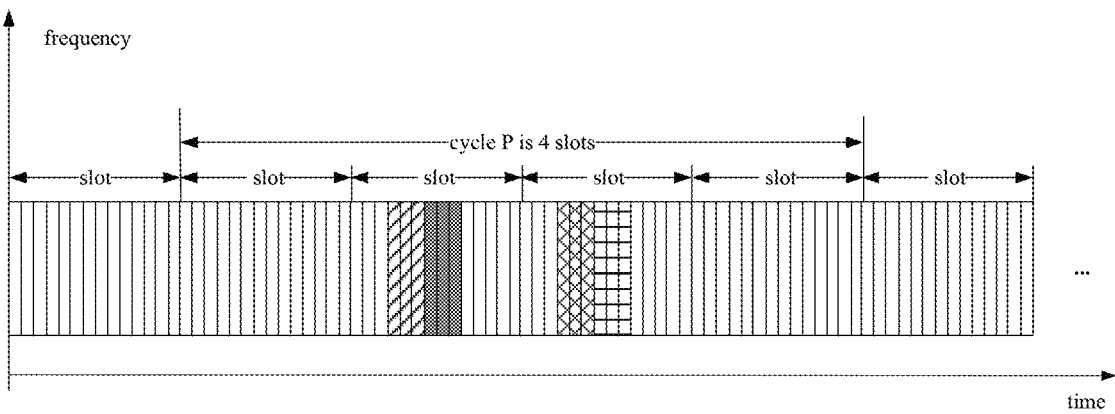
FIG. 3 is a second schematic diagram showing PUSCH transmission.

According to the foregoing configuration, in a second slot of each cycle, the terminal will perform a first PUSCH repetitive transmission on OFDM symbol indexes 3 to 5, and a second PUSCH repetitive transmission on OFDM symbol indexes 6 to 8. Then in a next slot, same time domain resource locations are occupied in the two slots, that is, the terminal will perform a third PUSCH repetitive transmission on OFDM symbol indexes 3 to 5, and a fourth PUSCH repetitive transmission on OFDM symbol indexes 6 to 8. A frequency domain resource location of each repetitive transmission is the same, and the specific transmission situation is shown in FIG. 3.

Third situation: in the first type of uplink scheduling-free transmission, when the PUSCH mapping type B scheme is adopted, a specific implementation of the embodiments of the present disclosure is as follows.

The network device configures, for UE through RRC signaling, information such as that a resource cycle P is 4 slots, a start slot is a first slot in the cycle, a time-frequency resource location of a first transmission in a slot is OFDM symbol index 2, a time domain resource length is 2 OFDM symbols, the number K of times of PUSCH repetitive transmissions is equal to 4, and PUSCH mapping type is PUSCH mapping type B. In the foregoing configuration, as starting from the OFDM symbol index 2 which is an even number, so single repetitive transmission is performed in one slot; there are 14 OFDM symbols in one slot and each repetitive transmission occupies 2 OFDM symbols.

Figure 4:
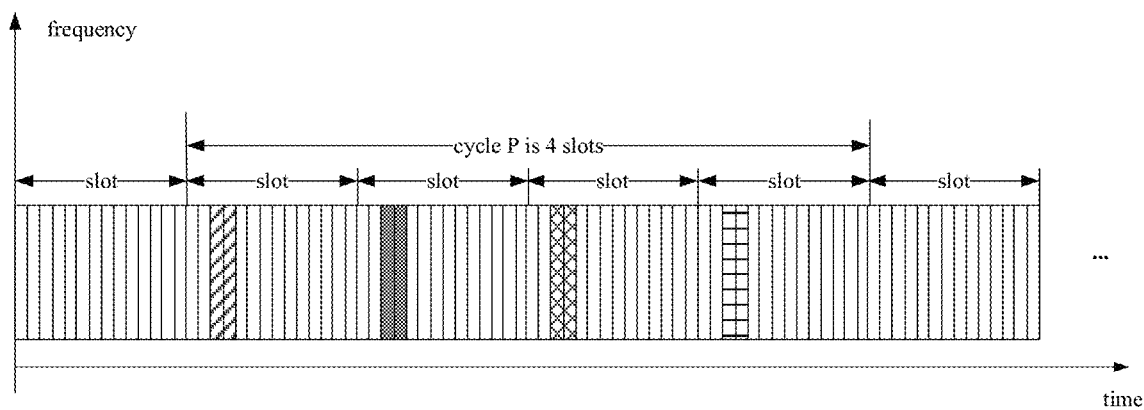
FIG. 4 is a third schematic diagram showing PUSCH transmission.

According to the foregoing configuration, in each cycle, the terminal will perform a first PUSCH repetitive transmission on OFDM symbol indexes 2 and 3 in a first slot; perform a second PUSCH repetitive transmission on OFDM symbol indexes 2 and 3 in a second slot; perform a third PUSCH repetitive transmission on OFDM symbol indexes 2 and 3 in a third slot; and perform a fourth PUSCH repetitive transmission on OFDM symbol indexes 2 and 3 in a fourth slot. A frequency domain resource location of each repetitive transmission is the same, and the specific transmission situation is shown in FIG. 4.

Fourth situation: in the first type of uplink scheduling-free transmission, when the PUSCH mapping type B scheme is adopted, a specific implementation of the embodiments of the present disclosure is as follows.

The network device configures, for the terminal through RRC signaling, information such as that a resource cycle P is 4 slots, a start slot is a first slot in the cycle, a time-frequency resource location of a first transmission in a slot is OFDM symbol index 7, a time domain resource length is 2 OFDM symbols, the number K of times of PUSCH repetitive transmissions is equal to 4, and PUSCH mapping type is PUSCH mapping type B. A given value V is specified by standards or configured by RRC, such as V=7. When the index of the start OFDM symbol is less than V, multiple repetitive transmissions are performed in one slot; when the index of the start OFDM symbol is greater than V, single repetitive transmission is performed in one slot.

In the foregoing configuration, as starting from the OFDM symbol index 7, the index of the start OFDM symbol is greater than or equal to V which is equal to 7, so single repetitive transmission is performed in one slot; there are 14 OFDM symbols in one slot and each repetitive transmission occupies 2 OFDM symbols.

Figure 5:
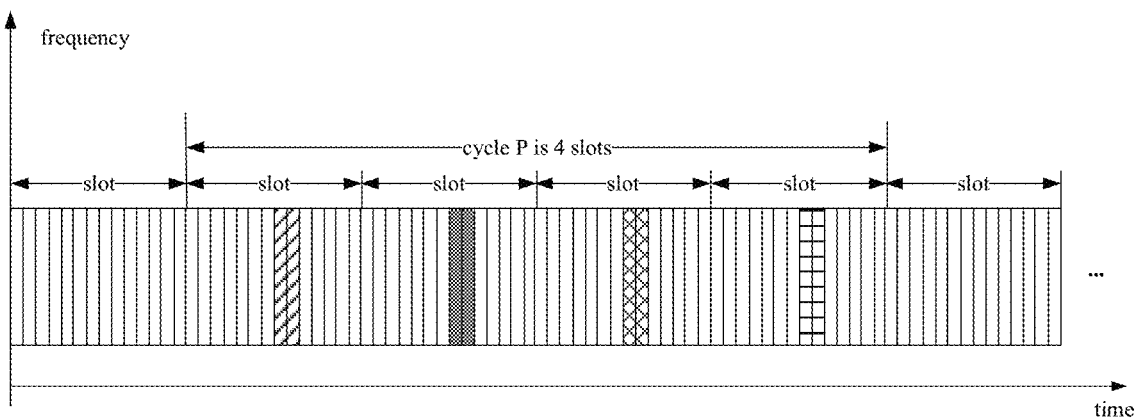
FIG. 5 is a fourth schematic diagram showing PUSCH transmission.

According to the foregoing configuration, in each cycle, the terminal will perform a first PUSCH repetitive transmission on OFDM symbol indexes 7 and 8 in a first slot; perform a second PUSCH repetitive transmission on OFDM symbol indexes 7 and 8 in a second slot; perform a third PUSCH repetitive transmission on OFDM symbol indexes 7 and 8 in a third slot; and perform a fourth PUSCH repetitive transmission on OFDM symbol indexes 7 and 8 in a fourth slot. A frequency domain resource location of each repetitive transmission is the same, and the specific transmission situation is shown in FIG. 5.

Fifth situation: in the second type of uplink scheduling-free transmission, when the PUSCH mapping type B scheme or the PUSCH mapping type A scheme is adopted, a specific implementation of the embodiments of the present disclosure is as follows.

In the 5G NR, the network device configures a PUSCH-symbol allocation table through RRC signaling. This table provides time domain resources of PUSCH, including K2, SLIV, PUSCH mapping type and other information. Meanwhile, indication information of a single repetitive transmission in one slot or multiple repetitive transmissions in one slot is added to this table, as shown in the following table 1:

TABLE 1

PUSCH-symbol Allocation table

| Index | K2 | Normal CP S | L | mapping type | single repetition or multiple repetition |
|---|---|---|---|---|---|
| 0 | 2 | 0 | 14 | A | single repetition |
| 1 | 3 | 0 | 14 | A | multiple repetition |
| 2 | 4 | 0 | 14 | A | single repetition |
| 3 | 2 | 0 | 10 | A | single repetition |
| 4 | 3 | 0 | 10 | A | multiple repetition |
| 5 | 4 | 0 | 10 | A | single repetition |
| 6 | 1 | 2 | 12 | B | single repetition |
| 7 | 2 | 2 | 12 | B | multiple repetition |
| 8 | 3 | 2 | 12 | B | single repetition |
| 9 | 1 | 3 | 11 | B | single repetition |
| 10 | 2 | 3 | 11 | B | multiple repetition |
| 11 | 1 | 4 | 10 | B | single repetition |
| 12 | 2 | 4 | 10 | B | multiple repetition |
| 13 | 3 | 4 | 10 | B | single repetition |
| 14 | 1 | 7 | 7 | B | single repetition |
| 15 | 2 | 7 | 7 | B | multiple repetition |

When the network device uses an activation signaling to notify the terminal to start PUSCH transmission, an index is given in a time domain resource indication of DCI, which is a value in a first column of the foregoing table 1, such as 12. According to the table and Index=12 in DCI, the terminal finds a corresponding single repetition or multiple repetition indication as multiple repetition, and then performs multiple repetitive transmissions in 1 slot.

It should be noted that locations of time-frequency domain resources mentioned in the embodiments of the present disclosure are all semi-static, thus the present disclosure has little impact on scheduling flexibility. In the embodiment of the present disclosure, when the transmission type is multiple repetitive transmissions of target data in one slot, the number of repetitive transmissions of the target data in each slot is determined, and then the target data is transmitted according to the number of repetitive transmissions, thereby realizing multiple repetitive data transmissions in one slot, improving the network communication process and increasing flexibility of the network communication.

It should be noted that the embodiments of the present disclosure are applicable to a situation where locations of time-frequency domain resources are dynamically scheduled.

Figure 6:
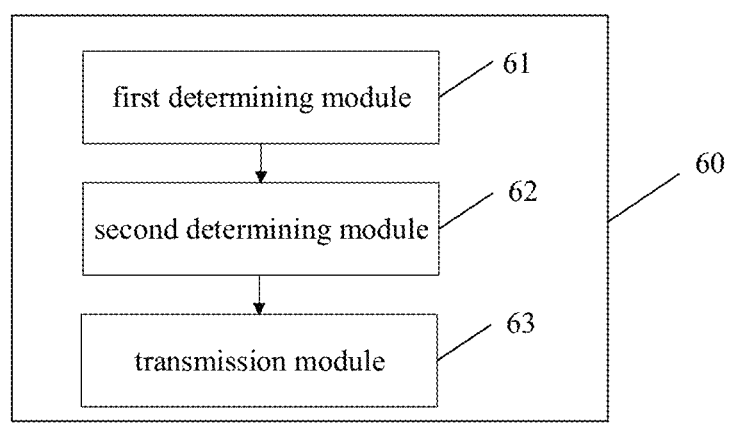
FIG. 6 is a schematic block diagram of a data transmission device according to an embodiment of the present disclosure.

As shown in FIG. 6, one embodiment of the present disclosure provides a data transmission device 60, including:

a first determining module 61 configured to determine a transmission type used when performing data transmission; where the transmission type includes one of a single transmission of target data in one slot and multiple repetitive transmissions of target data in one slot;

a second determining module 62 configured to determine the number of repetitive transmissions of the target data in each slot when the transmission type is multiple repetitive transmissions of target data in one slot;

a transmission module 63 configured to transmit the target data according to the number of repetitive transmissions of the target data in each slot.

Optionally, the first determining module 61 includes:
a first obtaining sub-module configured to obtain a location of a start orthogonal frequency division multiplexing OFDM symbol in a time-frequency resource location of a first transmission in a slot;
a first determining submodule configured to determine the transmission type used when performing data transmission according to the location of the start OFDM symbol.

Further, the first determining sub-module includes:
a first judgment unit configured to judge whether an index of the location of the start OFDM symbol is less than a preset value;
a first determining unit configured to determine that the transmission type is the multiple repetitive transmission of target data in one slot, when the index of the location of the start OFDM symbol is less than the preset value;
a second determining unit configured to determine that the transmission type is the single transmission of target data in one slot, when the index of the location of the start OFDM symbol is greater than or equal to the preset value.

Further, the first determining sub-module includes:
a third determining unit configured to determine a type of an index of the location of the start OFDM symbol;
a fourth determining unit configured to determine that the transmission type is the multiple repetitive transmission of target data in one slot, when the index of the location of the start OFDM symbol is a first preset type;
a fifth determining unit configured to determine that the transmission type is the single transmission of target data in one slot, when the index of the location of the start OFDM symbol is a second preset type.

Specifically, the first preset type is an odd type, and the second preset type is an even type.

Optionally, the first determining module 61 includes:
a second obtaining sub-module configured to obtain transmission type indication information;
a second determining sub-module configured to determine the transmission type used when performing data transmission according to the transmission type indication information.

Specifically, the transmission type indication information is a newly added field used to indicate the transmission type after each index in a target data symbol allocation table.

Further, the second determining module 62 includes:
a third determining sub-module configured to determine the number of repetitive transmissions of the target data in a slot, according to a location of a start orthogonal frequency division multiplexing OFDM symbol in a time-frequency resource location of a first transmission in a slot and the number of occupied symbols;
a fourth determining sub-module configured to determine the number of repetitive transmissions of the target data in each slot, if a target number of repetitive transmissions of the target data is unable to be completed within a slot;
where resources used for repetitive transmissions of the target data in each slot are the same, and slots occupied by completing the target number of the repetitive transmissions of the target data is the least.

Specifically, the fourth determining sub-module is configured to,
according to a formula: M=K/N, determine the number of repetitive transmissions of the target data in each slot;
where M represents the number of transmission times in each slot; K represents the target number of times; N represents the number of slots occupied by transmission of the target data.

Optionally, when the target data is PUSCH, the data transmission device is a terminal, and the data transmission includes: a first type of uplink scheduling-free transmission, a second type of uplink scheduling-free transmission or an uplink dynamic scheduling transmission.

Optionally, when the target data is PDSCH, the data transmission device is a network device, and the data transmission includes: downlink dynamic scheduling transmission or downlink semi-persistent scheduling transmission.

It should be noted that the device embodiment is a device corresponding to the foregoing method embodiment, and all the implementation methods in the foregoing method embodiment are applicable to the device embodiment, and the same technical effect can be achieved.

Figure 7:
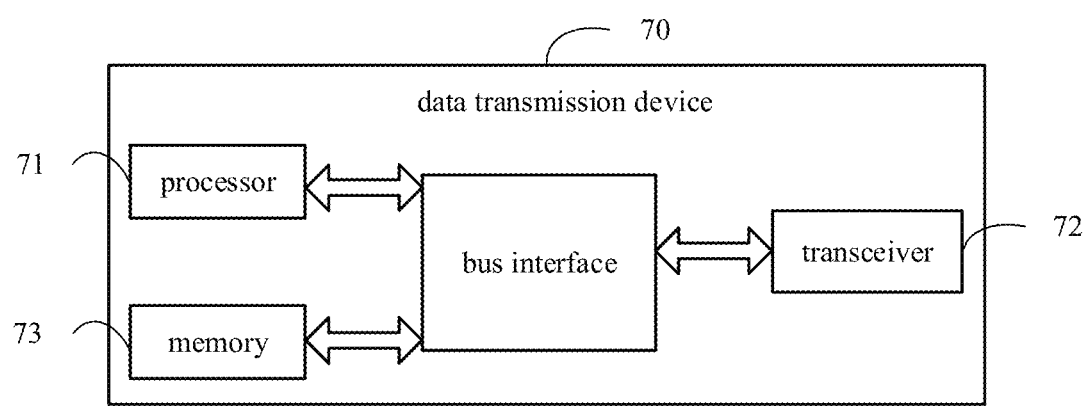
FIG. 7 is a schematic structural diagram of a data transmission device according to an embodiment of the present disclosure.

As shown in FIG. 7, one embodiment of the present disclosure further provides a data transmission device 70, including a processor 71, a transceiver 72, a memory 73, and a computer program stored on the memory 73 and executable on the processor 71. The transceiver 72 is connected to the processor 71 and the memory 73 through a bus interface. The processor 71 is configured to read the program in the memory to perform the following process:

determining a transmission type used when performing data transmission; where the transmission type includes one of a single transmission of target data in one slot and multiple repetitive transmissions of target data in one slot;

determining the number of repetitive transmissions of the target data in each slot, when the transmission type is multiple repetitive transmissions of target data in one slot;

transmitting the target data through the transceiver 72, according to the number of repetitive transmissions of the target data in each slot.

It should be noted that, In FIG. 7, a bus architecture may include any number of interconnected buses and bridges. Specifically, various circuits of one or more processors, which are represented by the processor 71, and the storage, which is represented by the memory 73, are linked together. The bus architecture may link various other circuits, such as a peripheral device, voltage regulator and a power management circuit together. These features are well known in this field, therefore, this disclosure does not make further description on these features. The bus interface provides an interface. The transceiver 72 may be multiple elements, including a transmitter and a receiver and provide units, which communicate with other devices on the transmission medium. For different terminals, the processor 71 is responsible for managing the bus architecture and common processing, and the memory 73 may store data used by the processor 71 when executing the operations.

The processor executes the computer program to perform the following process:

obtaining a location of a start orthogonal frequency division multiplexing OFDM symbol in a time-frequency resource location of a first transmission in a slot;

determining the transmission type used when performing data transmission according to the location of the start OFDM symbol.

Further, the processor executes the computer program to perform the following process:

judging whether an index of the location of the start OFDM symbol is less than a preset value;

determining that the transmission type is the multiple repetitive transmission of target data in one slot, when the index of the location of the start OFDM symbol is less than the preset value;

determining that the transmission type is the single transmission of target data in one slot, when the index of the location of the start OFDM symbol is greater than or equal to the preset value.

Further, the processor executes the computer program to perform the following process:

determining a type of an index of the location of the start OFDM symbol;

determining that the transmission type is the multiple repetitive transmission of target data in one slot, when the index of the location of the start OFDM symbol is a first preset type;

determining that the transmission type is the single transmission of target data in one slot, when the index of the location of the start OFDM symbol is a second preset type.

Specifically, the first preset type is an odd type, and the second preset type is an even type.

Optionally, the processor executes the computer program to perform the following process:

obtaining transmission type indication information;

determining the transmission type used when performing data transmission according to the transmission type indication information.

Specifically, the transmission type indication information is a newly added field used to indicate the transmission type after each index in a target data symbol allocation table.

Optionally, the processor executes the computer program to perform the following process:

determining the number of repetitive transmissions of the target data in a slot, according to a location of a start orthogonal frequency division multiplexing OFDM symbol in a time-frequency resource location of a first transmission in a slot and the number of occupied symbols;

determining the number of repetitive transmissions of the target data in each slot, if a target number of repetitive transmissions of the target data is unable to be completed within a slot;

where resources used for repetitive transmissions of the target data in each slot are the same, and slots occupied by completing the target number of the repetitive transmissions of the target data is the least.

Optionally, the processor executes the computer program to perform the following process:

according to a formula: $M=K/N$, determining the number of repetitive transmissions of the target data in each slot;

where M represents the number of transmission times in each slot; K represents the target number of times; N represents the number of slots occupied by transmission of the target data.

Specifically, when the target data is PUSCH, the data transmission device is a terminal, and the data transmission includes: a first type of uplink scheduling-free transmission, a second type of uplink scheduling-free transmission or an uplink dynamic scheduling transmission.

Specifically, when the target data is PDSCH, the data transmission device is a network device, and the data transmission includes: downlink dynamic scheduling transmission or downlink semi-persistent scheduling transmission.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The person skilled in this field can understand that all or part of processes in the foregoing method embodiment may be implemented by controlling relevant hardware through a computer program. The program may be stored in a computer readable storage medium. The program is executed to implement procedures of the foregoing method embodiments. The storage medium may be a magnetic disk, an optical disk, ROM, or RAM, etc.

One embodiment of the present disclosure further provides a computer-readable storage medium which stores a computer program thereon. The computer program is executed by a processor to implement steps of the above data transmission method.

It should be noted here that the network device mentioned in the embodiments of the present disclosure may be a base transceiver station (BTS) in a global system of mobile communication (GSM) or a code division multiple access (CDMA), or a NodeB (NB) in a Wideband Code Division Multiple Access (WCDMA), or an evolutional Node B (eNB, or, eNodeB) in the LTE, or a relay station or an access point, or a base station in the future 5G network, etc., which are not limited here.

The above are only the specific embodiments of the present disclosure. Any technical personnel who is familiar with the technical field can easily think of changes or substitutions within the technical scope of the present disclosure and these changes and substitutions should be included in the protection scope of the present disclosure.

What is claimed is:

1. A data transmission method, applied to a data transmission device, comprising:
   determining a transmission type used when performing data transmission; wherein the transmission type includes one of a single transmission of target data in one slot and multiple repetitive transmissions of target data in one slot;
   determining the number of repetitive transmissions of the target data in each slot, when the transmission type is multiple repetitive transmissions of target data in one slot;
   transmitting the target data according to the number of repetitive transmissions of the target data in each slot;
   wherein transmission of the target data occupies multiple slots, and the target data is physical uplink shared channel (PUSCH) or physical downlink shared control channel (PDSCH);
   wherein the step of determining a transmission type used when performing data transmission, includes:
   obtaining a location of a start orthogonal frequency division multiplexing (OFDM) symbol in a time-frequency resource location of a first transmission in a slot;
   determining the transmission type used when performing data transmission according to the location of the start OFDM symbol;
   wherein the step of determining the transmission type used when performing data transmission according to the location of the start OFDM symbol, includes:
   judging whether an index of the location of the start OFDM symbol is less than a preset value; determining that the transmission type is the multiple repetitive transmissions of target data in one slot, when the index of the location of the start OFDM symbol is less than the preset value; determining that the transmission type is the single transmission of target data in one slot, when the index of the location of the start OFDM symbol is greater than or equal to the preset value;
   or,
   determining a type of an index of the location of the start OFDM symbol; determining that the transmission type is the multiple repetitive transmissions of target data in one slot, when the index of the location of the start OFDM symbol is a first preset type; determining that the transmission type is the single transmission of target data in one slot, when the index of the location of the start OFDM symbol is a second preset type.

2. The data transmission method according to claim 1, wherein the first preset type is an odd type, and the second preset type is an even type.

3. The data transmission method according to claim 1, wherein the step of determining the number of repetitive transmissions of the target data in each slot, includes:
   determining the number of repetitive transmissions of the target data in a slot, according to a location of a start orthogonal frequency division multiplexing (OFDM) symbol in a time-frequency resource location of a first transmission in a slot and the number of occupied symbols;

determining the number of repetitive transmissions of the target data in each slot, if a target number of repetitive transmissions of the target data is unable to be completed within a slot;

wherein resources used for repetitive transmissions of the target data in each slot are the same, and slots occupied by completing the target number of the repetitive transmissions of the target data is the least.

4. The data transmission method according to claim 3, wherein the step of determining the number of repetitive transmissions of the target data in each slot, includes:

according to a formula: M=K/N, determining the number of repetitive transmissions of the target data in each slot;

wherein M represents the number of transmission times in each slot; K represents a target number of times; N represents the number of slots occupied by transmission of the target data.

5. The data transmission method according to claim 1, wherein when the target data is physical uplink shared channel (PUSCH), the data transmission device is a terminal, and the data transmission includes: a first type of uplink scheduling-free transmission, a second type of uplink scheduling-free transmission or an uplink dynamic scheduling transmission;

wherein when the target data is physical downlink shared control channel (PDSCH), the data transmission device is a network device, and the data transmission includes: downlink dynamic scheduling transmission or downlink semi-persistent scheduling transmission.

6. A data transmission device, comprising: a memory, a processor, and a computer program stored on the memory and executable on the processor; wherein the processor executes the computer program to perform the following steps of:

determining a transmission type used when performing data transmission; wherein the transmission type includes one of a single transmission of target data in one slot and multiple repetitive transmissions of target data in one slot;

determining the number of repetitive transmissions of the target data in each slot, when the transmission type is multiple repetitive transmissions of target data in one slot;

transmitting the target data according to the number of repetitive transmissions of the target data in each slot;

wherein transmission of the target data occupies multiple slots, and the target data is physical uplink shared channel (PUSCH) or physical downlink shared control channel (PDSCH);

wherein the processor executes the computer program to perform the following steps of:

obtaining a location of a start orthogonal frequency division multiplexing (OFDM) symbol in a time-frequency resource location of a first transmission in a slot;

determining the transmission type used when performing data transmission according to the location of the start OFDM symbol;

wherein when determining the transmission type used when performing data transmission according to the location of the start OFDM symbol, the processor executes the computer program to perform:

judging whether an index of the location of the start OFDM symbol is less than a preset value; determining that the transmission type is the multiple repetitive transmissions of target data in one slot, when the index of the location of the start OFDM symbol is less than the preset value; determining that the transmission type is the single transmission of target data in one slot, when the index of the location of the start OFDM symbol is greater than or equal to the preset value;

or, determining a type of an index of the location of the start OFDM symbol; determining that the transmission type is the multiple repetitive transmissions of target data in one slot, when the index of the location of the start OFDM symbol is a first preset type; determining that the transmission type is the single transmission of target data in one slot, when the index of the location of the start OFDM symbol is a second preset type.

7. The data transmission device according to claim 6, wherein the first preset type is an odd type, and the second preset type is an even type.

8. The data transmission device according to claim 6, wherein the processor executes the computer program to perform the following steps of:

determining the number of repetitive transmissions of the target data in a slot, according to a location of a start orthogonal frequency division multiplexing (OFDM) symbol in a time-frequency resource location of a first transmission in a slot and the number of occupied symbols;

determining the number of repetitive transmissions of the target data in each slot, if a target number of repetitive transmissions of the target data is unable to be completed within a slot;

wherein resources used for repetitive transmissions of the target data in each slot are the same, and slots occupied by completing the target number of the repetitive transmissions of the target data is the least.

9. The data transmission device according to claim 8, wherein the processor executes the computer program to perform the following steps of:

according to a formula: M=K/N, determining the number of repetitive transmissions of the target data in each slot;

wherein M represents the number of transmission times in each slot; K represents a target number of times; N represents the number of slots occupied by transmission of the target data.

10. The data transmission device according to claim 6, wherein when the target data is physical uplink shared channel (PUSCH), the data transmission device is a terminal, and the data transmission includes: a first type of uplink scheduling-free transmission, a second type of uplink scheduling-free transmission or an uplink dynamic scheduling transmission;

wherein when the target data is physical downlink shared control channel (PDSCH), the data transmission device is a network device, and the data transmission includes: downlink dynamic scheduling transmission or downlink semi-persistent scheduling transmission.

* * * * *